(12) United States Patent
Taguchi et al.

(10) Patent No.: US 11,338,950 B2
(45) Date of Patent: May 24, 2022

(54) INSPECTION DEVICE, PTP PACKAGING MACHINE AND PTP SHEET MANUFACTURING METHOD

(71) Applicant: CKD CORPORATION, Aichi (JP)

(72) Inventors: Yukihiro Taguchi, Aichi (JP); Tsuyoshi Ohyama, Aichi (JP); Norihiko Sakaida, Aichi (JP)

(73) Assignee: CKD CORPORATION, Aichi (JP)

( * ) Notice: Subject to any disclaimer, the term of this patent is extended or adjusted under 35 U.S.C. 154(b) by 472 days.

(21) Appl. No.: 16/592,902

(22) Filed: Oct. 4, 2019

(65) Prior Publication Data

US 2020/0031511 A1   Jan. 30, 2020

Related U.S. Application Data

(63) Continuation of application No. PCT/JP2017/035224, filed on Sep. 28, 2017.

(30) Foreign Application Priority Data

Apr. 5, 2017   (JP) .............................. JP2017-074908

(51) Int. Cl.
   *G01J 5/02*         (2022.01)
   *B65B 57/10*        (2006.01)
   (Continued)

(52) U.S. Cl.
   CPC .............. *B65B 57/10* (2013.01); *B65B 9/045* (2013.01); *B65D 75/367* (2013.01);
   (Continued)

(58) Field of Classification Search
   CPC ....... B65B 57/10; B65B 9/045; B65D 75/367; B65D 2585/56; G01N 21/3563;
   (Continued)

(56) References Cited

FOREIGN PATENT DOCUMENTS

| JP | H8-233732 A | 9/1996 |
|----|-------------|--------|
| JP | H11-241948 A | 9/1999 |

(Continued)

OTHER PUBLICATIONS

International Search Report issued in International Application No. PCT/JP2017/035224, dated Dec. 26, 2017 (4 pages).

(Continued)

*Primary Examiner* — Kiho Kim
(74) *Attorney, Agent, or Firm* — Osha Bergman Watanabe & Burton LLP

(57) ABSTRACT

An inspection device includes: an irradiator that irradiates an object with near-infrared light; a spectroscope that has a slit where reflected light enters and that disperses the reflected light into wavelength component lights; an imaging device that comprises an imaging element that takes a spectroscopic image of the wavelength component lights; and a processor that: obtains spectral data based on the spectroscopic image; and detects a type of the object using a predetermined analysis based on the spectral data. Each of the wavelength component lights is a single wavelength light, the inspection device satisfies L≥2P, where L is a width of each of the wavelength component lights in a wavelength dispersion direction on a light receiving surface of the imaging element and P is a width of a pixel in the wavelength dispersion direction on the light receiving surface.

14 Claims, 14 Drawing Sheets

(51) Int. Cl.
  *B65B 9/04* (2006.01)
  *B65D 75/36* (2006.01)
  *G01N 21/3563* (2014.01)
  *G01N 21/359* (2014.01)
  *G01N 21/95* (2006.01)

(52) U.S. Cl.
  CPC ....... *G01N 21/359* (2013.01); *G01N 21/3563* (2013.01); *G01N 21/9508* (2013.01); *B65D 2585/56* (2013.01)

(58) Field of Classification Search
  CPC ............. G01N 21/359; G01N 21/9508; G01N 2021/845; G01J 2003/1208
  See application file for complete search history.

(56) References Cited

FOREIGN PATENT DOCUMENTS

| | | |
|---|---|---|
| JP | 2002-188960 A | 7/2002 |
| JP | 2008-066397 A | 3/2008 |
| JP | 2010-112887 A | 5/2010 |
| JP | 2010-175528 A | 8/2010 |
| JP | 2010175528 A * | 8/2010 |
| JP | 2012-145429 A | 8/2012 |
| JP | 2017-015489 A | 1/2017 |
| WO | 2015/136620 A1 | 9/2015 |

OTHER PUBLICATIONS

Written Opinion issued in International Application No. PCT/JP2017/035224, dated Dec. 26, 2017 (7 pages).
Notification of Reasons for Refusal issued in corresponding Japanese patent Application No. 2017-074908, dated May 1, 2018 (11 pages).
Notification of Reasons for Refusal issued in corresponding Japanese patent Application No. 2017-074908, dated Aug. 28, 2018 (10 pages).
International Preliminary Report on Patentability issued in International Patent Application No. PCT/JP2017/035224, dated Oct. 17, 2019 (23 pages).

* cited by examiner

INSPECTION DEVICE, PTP PACKAGING MACHINE AND PTP SHEET MANUFACTURING METHOD

BACKGROUND

Technical Field

The present invention relates to an inspection device configured to inspect for inclusion of any different type of object by taking advantage of spectral analysis, a Press Through Package (PTP) packaging machine, and a PTP sheet manufacturing method.

Description of Related Art

A PTP sheet is generally comprised of a container film that has pocket portions filled with objects, such as tablets, and a cover film that is mounted to the container film such as to seal openings of the pocket portions.

In a process of manufacturing the PTP sheet, a different type inclusion inspection is performed to inspect for inclusion of any different type of object. A method that takes advantage of spectral analysis is conventionally known as a technique of such inspection (as described in, for example, Patent Literature 1).

For example, this technique irradiates an object 83 filled in a pocket portion 82 of a container film 81 with near-infrared light $H_1$ in a manufacturing process of the PTP sheet as shown in FIG. 15. Reflected light $H_2$ that is reflected from the object 83 or the like is collected by an optical lens 85 to form parallel light $H_3$. Light passing through a slit 86 out of the parallel light $H_3$ forms belt-like slit light $H_4$ and enters a spectroscope (prism) 87.

The slit light $H_4$ entering the spectroscope 87 is dispersed into slit lights of respective wavelength components (hereinafter referred to as "wavelength component lights") $H_S$, and the dispersed wavelength component lights $H_S$ are projected on a light receiving surface 88a of an imaging element 88. For example, near-infrared light having a wavelength band of 900 nm to 1700 nm is dispersed into several ten to several hundred bands at a wavelength resolution of a 1 nm interval to 10 nm interval. Inclusion of any different type of object is detected by principal component analysis of spectral data obtained by imaging the respective wavelength component lights $H_S$.

PATENT LITERATURE

Patent Literature 1: JP 2010-175528A

The respective wavelength component lights $H_S$ dispersed by the spectroscope 87 are, however, projected at different positions on the light receiving surface 88a of the imaging element 88, due to a difference in wavelength component. Some configuration may thus cause a failure in appropriately reflecting the luminance level of each wavelength component light $H_S$ on spectral data.

For example, it is here assumed that a width L of each wavelength component light $H_S$, which is projected on the light receiving surface 88a of the imaging element 88, in a wavelength dispersion direction on the light receiving surface 88a is identical with a width P of each pixel (light receiving element) 90 of the imaging element 88 in the wavelength dispersion direction on the light receiving surface 88a (L=P).

Under this assumption, as shown in FIG. 16, a wavelength component light $H_{SA}$ of a wavelength $\lambda_A$ that has a projection position perfectly matching with one pixel 90 is fully (100%) received by this one pixel 90. This accordingly enables the luminance level of the wavelength component light $H_{SA}$ to be appropriately reflected on the spectral data.

As shown in FIG. 17, on the other hand, a wavelength component light $H_{SB}$ of a wavelength $\lambda_B$ that has a projection position extended over two pixels 90 is received by these two pixels 90 in a dispersive manner. A value reflected on the spectral data is thus likely to be reduced by 50% at the maximum, compared with a value corresponding to the proper luminance level of the wavelength component light $H_{SB}$.

Even when the respective wavelength component lights $H_S$ emitted from the spectroscope 87 have identical luminance levels, the value detected as the luminance level of each wavelength component light $H_S$ is likely to vary, due to a difference in wavelength component between the respective wavelength component lights $H_S$ or more specifically due to a difference in projection position on the light receiving surface 88a of the imaging element 88, as shown in FIG. 18. Such a variation is likely to cause a failure in obtaining appropriate spectral data. As a result, this is likely to reduce the inspection accuracy.

SUMMARY

One or more embodiments of the present invention provide an inspection device configured to improve the inspection accuracy relating to a different type inclusion inspection that takes advantage of spectral analysis, as well as a PTP packaging machine and a PTP sheet manufacturing method.

The following describes functions and advantageous effects of one or more embodiments.

According to one or more embodiments, there is provided an inspection device comprising an irradiation unit (irradiator) configured to irradiate an object with near-infrared light; a spectral unit (spectroscope) configured to cause reflected light that is reflected from the object irradiated with the near-infrared light to enter the spectral unit via a predetermined slit and to disperse the entering reflected light into a plurality of wavelength component lights; an imaging unit (imaging device) provided with an imaging element that is configured to take a spectroscopic image with regard to the plurality of wavelength component lights dispersed by the spectral unit; a spectral data obtaining unit configured to obtain spectral data, based on the spectroscopic image; and an analysis unit configured to detect a different type of object by performing a predetermined analysis process (for example, principal component analysis) based on the spectral data. The inspection device is set to satisfy a relational expression (1) given below:

$$L \geq 2P \tag{1}$$

where L denotes a width of each wavelength component light in a wavelength dispersion direction on a light receiving surface of the imaging element, and P denotes a width of a pixel (light receiving element) in the wavelength dispersion direction on the light receiving surface of the imaging element.

The above "wavelength component light" includes not only single wavelength light (monochromatic light) but light of a predetermined wavelength band according to the wavelength resolution of the spectral unit.

In the inspection device of one or more embodiments, the relationship between the light receiving surface of the imaging element and each wavelength component light projected thereon is set to satisfy the relational expression (1) given above. Accordingly, with respect to each of all the wavelength component lights, there is at least one pixel that is capable of receiving one wavelength component light across the full width in the wavelength dispersion direction, irrespective of the projection position of each wavelength component light on the light receiving surface of the imaging element. As a result, the luminance level of each wavelength component light is appropriately reflected on the spectral data. This configuration thus improves the inspection accuracy.

According to one or more embodiments, the inspection device may further comprise a slit adjustment unit configured to adjust a width of the slit.

The configuration of one or more embodiments adjusts the width of the slit and thereby readily provides a setting to satisfy the relational expression (1) given above.

A relationship between a width W of the slit and the width L of each wavelength component light in the wavelength dispersion direction on the light receiving surface of the imaging element is defined by a relational expression (2) given below when the slit light is parallel light (as shown in FIG. 15).

$$L = W/\cos\theta \qquad (2)$$

where $\theta$ denotes an incident angle of the wavelength component light relative to the light receiving surface of the imaging element.

According to one or more embodiments, the inspection device may further comprise an imaging element adjustment unit configured to adjust an inclination of the imaging element.

The configuration of one or more embodiments adjusts the inclination of the imaging element so as to adjust the incident angle $\theta$ of the wavelength component light relative to the light receiving surface and thereby readily provides a setting to satisfy the relational expression (1) given above.

According to one or more embodiments, there is provided a PTP packaging machine configured to manufacture a PTP sheet, such that an object is contained in a pocket portion formed in a container film and that a cover film is mounted to the container film, so as to close the pocket portion. The PTP packaging machine comprises a pocket portion forming unit (pocket portion former) configured to form the pocket portion in the container film that is conveyed in a belt-like manner; a filling unit (filler) configured to fill the object into the pocket portion; a mounting unit (mounter) configured to mount the cover film in a belt-like shape to the container film with the pocket portion filled with the object, so as to close the pocket portions; a separation unit (separator) (including a punching unit to punch out in a sheet unit) configured to separate the PTP sheet from a belt-like body (belt-like PTP film) obtained by mounting the cover film to the container film; and the inspection device described in one or more embodiments.

In one or more embodiments, the PTP packaging machine is provided with the inspection device. This configuration has, for example, an advantage of efficiently excluding defective products that include different types of objects, in a manufacturing process of the PTP sheet. The PTP packaging machine may further be provided with a discharge unit configured to discharge any PTP sheet determined as defective by the above inspection device.

According to a modification of one or more embodiments, the inspection device may be placed in "a previous process before the object is filled into the pocket portion by the filling unit". This configuration enables a different type of object to be excluded in a stage prior to filling the object into the pocket portion and reduces the number of PTP sheets that are specified as defective products.

According to another modification, the inspection device may be placed in "a post process after the object is filled into the pocket portion by the filling unit and a previous process before the cover film is mounted by the mounting unit". This configuration enables an inspection to be performed in the state that the object is not concealed and thereby further improves the inspection accuracy.

According to another modification, the inspection device may be placed in "a post process after the cover film is mounted by the mounting unit and a previous process before the PTP sheet is separated by the separation unit". This configuration enables an inspection to be performed in the state that the object is not replaceable and thereby further improves the inspection accuracy.

According to another modification, the inspection device may be placed in "a post process after the PTP sheet is separated by the separation unit". This configuration allows for a check to determine whether any defective product is included in a final stage.

According to one or more embodiments, there is provided a PTP sheet manufacturing method performed to manufacture a PTP sheet, such that an object is contained in a pocket portion formed in a container film and that a cover film is mounted to the container film, so as to close the pocket portion. The PTP sheet manufacturing method comprises a pocket portion forming process of forming the pocket portion in the container film that is conveyed in a belt-like manner; a filling process of filling the object into the pocket portion; a mounting process of mounting the cover film in a belt-like shape to the container film with the pocket portion filled with the object, so as to close the pocket portions; a separation process (including a punching process of punching out in a sheet unit) of separating the PTP sheet from a belt-like body (belt-like PTP film) obtained by mounting the cover film to the container film; and an inspection process of inspecting for inclusion of a different type of object. The inspection process comprises an irradiation process of irradiating the object with near-infrared light; a dispersion process of causing reflected light that is reflected from the object irradiated with the near-infrared light to enter a predetermined spectral unit via a predetermined slit and dispersing the entering reflected light into a plurality of wavelength component lights; an imaging process (exposure process) of using an imaging unit provided with a predetermined imaging element to take a spectroscopic image with regard to the plurality of wavelength component lights; a spectral data obtaining process of obtaining spectral data, based on the spectroscopic image; and an analysis process of detecting a different type of object by performing a predetermined analysis process based on the spectral data. The inspection process is performed under setting that satisfies a relational expression (1) given below:

$$L \geq 2P \qquad (1)$$

where L denotes a width of each wavelength component light in a wavelength dispersion direction on a light receiving surface of the imaging element, and P denotes a width of a pixel in the wavelength dispersion direction on the light receiving surface of the imaging element.

The configuration of one or more embodiments has similar functions and advantageous effects to those of the embodiments described above. According to a modification of one or more embodiments, the inspection process may be performed in "a previous process before the filling process". This configuration enables a different type of object to be excluded in a stage prior to filling the object into the pocket portion and reduces the number of PTP sheets that are specified as defective products.

According to another modification, the inspection process may be performed in "a post process after the filling process and a previous process before the mounting process". This configuration enables an inspection to be performed in the state that the object is not concealed and thereby further improves the inspection accuracy.

According to another modification, the inspection process may be performed in "a post process after the mounting process and a previous process before the separation process". This configuration enables an inspection to be performed in the state that the object is not replaceable and thereby further improves the inspection accuracy.

According to another modification, the inspection process may be performed in "a post process after the separation process". This configuration allows for a check to determine whether any defective product is included in a final stage.

According to one or more embodiments, the PTP sheet manufacturing method may further comprise a slit adjustment process of adjusting a width of the slit.

The configuration of one or more embodiments has similar functions and advantageous effects to those of the embodiments described above.

According to one or more embodiments, the PTP sheet manufacturing method may further comprise an imaging element adjustment process of adjusting an inclination of the imaging element.

The configuration of one or more embodiments has similar functions and advantageous effects to those of the embodiments described above.

DETAILED DESCRIPTION

The following describes embodiments with reference to drawings. The configuration of a PTP sheet is described first in detail.

Figure 1A:
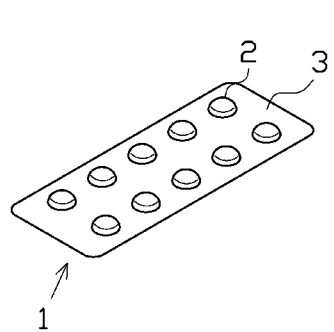
FIG. 1A is a perspective view illustrating a PTP sheet according to one or more embodiments and FIG. 1B is a perspective view illustrating a PTP film according to one or more embodiments.
Figure 1B:
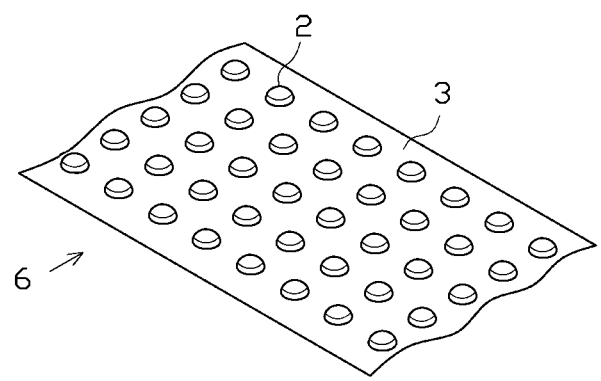
Figure 2:
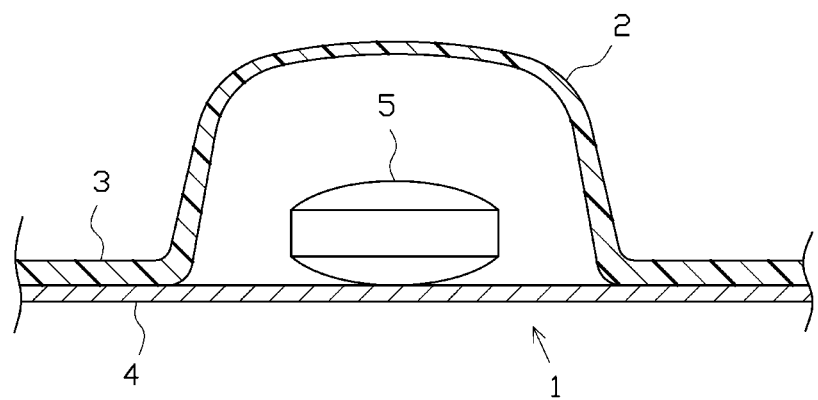
FIG. 2 is a partly enlarged sectional view illustrating a pocket portion of the PTP sheet according to one or more embodiments.

As shown in FIG. 1 and FIG. 2, a PTP sheet 1 includes a container film 3 provided with a plurality of pocket portions 2, and a cover film 4 mounted to the container film 3 such as to close the respective pocket portions 2. One tablet 5 is placed as an object in each of the pocket portions 2.

The container film 3 according to one or more embodiments is made of a transparent or translucent thermoplastic resin material, such as PP (polypropylene) or PVC (polyvinyl chloride) and has translucency. The cover film 4 is, on the other hand, made of aluminum.

The PTP sheet 1 (shown in FIG. 1A) is manufactured by punching sheets from a belt-like PTP film 6 (shown in FIG. 1B) that is comprised of the belt-like container film 3 and the belt-like cover film 4.

Figure 3:
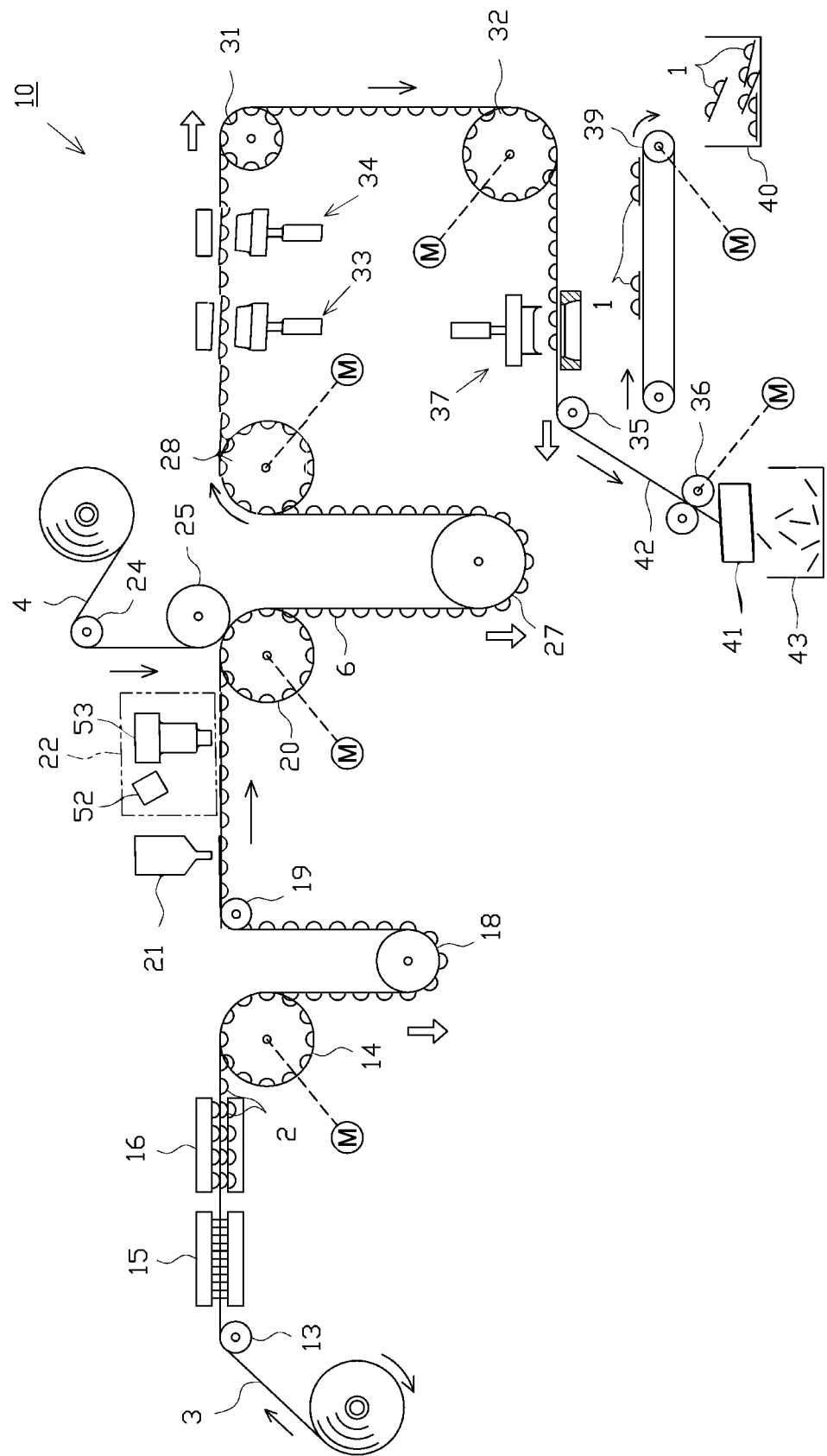
FIG. 3 is a diagram illustrating the schematic configuration of a PTP packaging machine according to one or more embodiments.

The following describes the general configuration of a PTP packaging machine 10 used to manufacture the PTP sheet 1 described above, with reference to FIG. 3.

Figure 13:
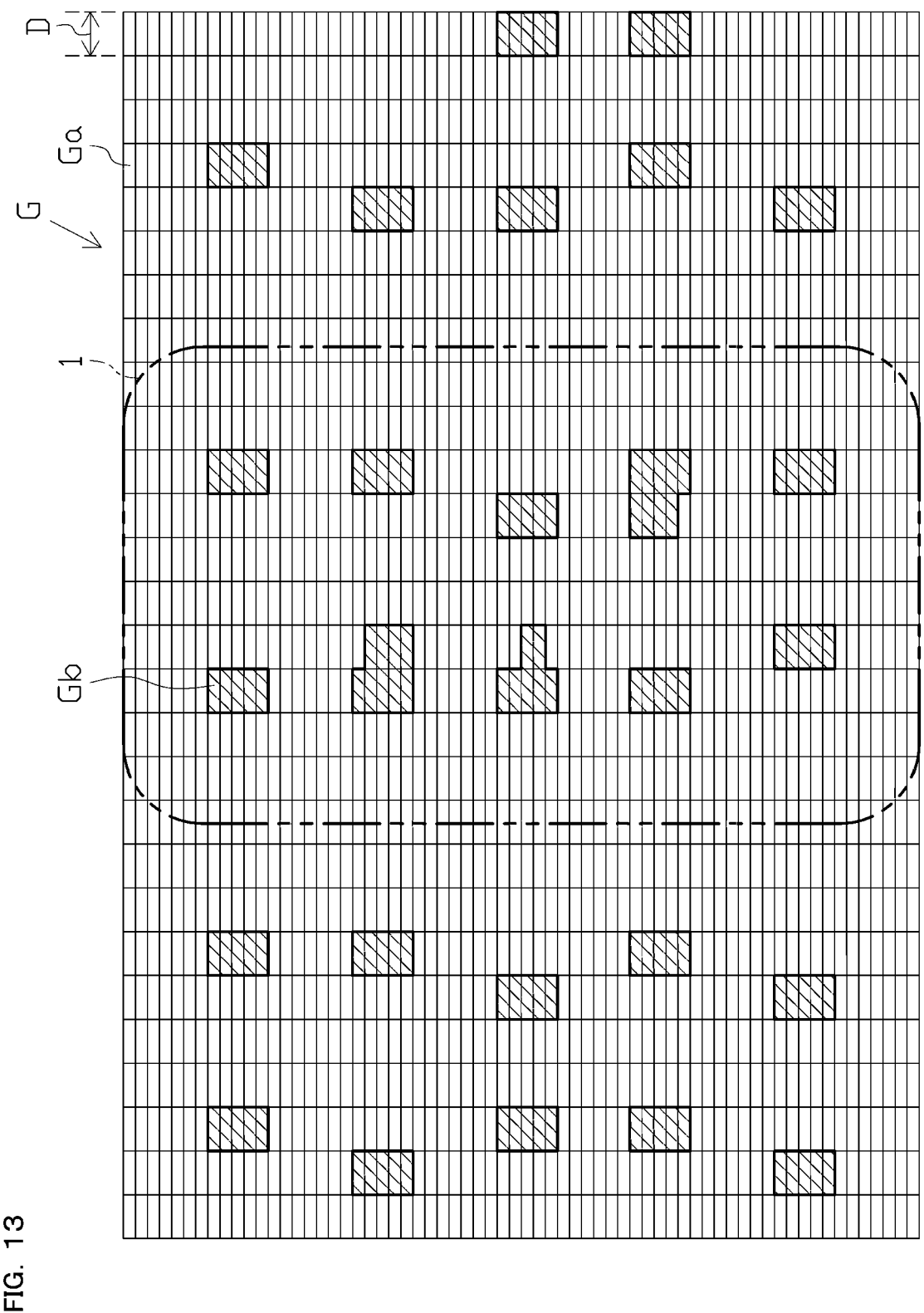
FIG. 13 is a diagram illustrating a spectral image according to one or more embodiments.

As shown in FIG. 13, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is coupled with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. In the state that the container film 3 is heated to be relatively soft by the heating device 15, the plurality of pocket portions 2 are formed at predetermined positions of the container film 3 by the pocket portion forming device 16 (pocket portion forming process). The heating device 15 and the pocket portion forming device 16 provide the pocket portion forming unit according to one or more embodiments. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is coupled with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 is placed along the conveyance path of the container film 3 between the guide roll 19 and the film receiving roll 20. The tablet filling device 21 serves as the filling unit to automatically fill the tablets 5 into the pocket portions 2. The tablet filling device 21 opens a shutter at every predetermined time interval to drop the tablet 5, in synchronism with the conveying operation of the container film 3 by the film receiving roll 20. Each of the pocket portions 2 is filled with the tablet 5 by this shutter opening operation (filling process).

An inspection device 22 is placed along the conveyance path of the container film 3 between the tablet filling device 21 and the film receiving roll 20. The inspection device 22 is an inspection device configured to perform an inspection by taking advantage of spectral analysis and more specifically inspect for inclusion of any different type of object. The details of the inspection device 22 will be described later.

A film roll of the belt-like cover film 4 is also wound on a roll form and is placed on a most upstream side.

A pullout end of the cover film 4 wound in the roll form is guided by a guide roll 24 to a heating roll 25. The heating roll 25 is pressed against to be in contact with the film receiving roll 20 described above. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations provides the belt-like PTP film 6 manufactured such that the tablet 5 is filled in each of the pocket portions 2. The heating roll 25 has minute protrusions formed on the surface of the heating roll 25 in a net-like pattern for sealing. Strongly pressing these protrusions against the films provides secure sealing. The film receiving roll 20 and the heating roll 25 provide the mounting unit according to one or more embodiments.

The PTP film 6 fed from the film receiving roll 20 is sequentially laid on a tension roll 27 and an intermittent feed roll 28 in this order. The intermittent feed roll 28 is coupled with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is coupled with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves as a sheet punching unit (separation unit) to punch out the outer periphery of each portion of the PTP film 6 in the unit of PTP sheet 1.

The respective PTP sheets 1 punched out by the sheet punching device 37 are conveyed by an extraction conveyor 39 and are temporarily accumulated in a finished product hopper 40 (separation process). When a PTP sheet 1 is determined as a defective product by the inspection device 22 described above, this PTP sheet 1 determined as defective is separately discharged by a non-illustrated defective sheet discharge mechanism serving as the discharge unit.

A cutting device 41 is provided on a downstream side of the continuous feed roll 36. An unrequired film portion 42 that is a residual part (scrap part) remaining in a belt-like form after punching out by the sheet punching device 37 is guided by the tension roll 35 and the continuous feed roll 36 and is subsequently led to the cutting device 41. A driven roll is pressed against to be in contact with the continuous feed roll 36, so that the unrequired film portion 42 is placed and conveyed between the driven roll and the continuous feed roll 36. The cutting device 41 serves to cut the unrequired film portion 42 into predetermined dimensions as scraps. These scraps are accumulated in a scrap hopper 43 and are disposed separately.

Each of the rolls, for example, the rolls 14, 20, 28, 31 and 32 described above is arranged such that the roll surface is opposed to the pocket portions 2. The surface of each roll, for example, the surface of the intermittent feed roll 14, has recesses that are formed to place the pocket portions 2 therein. This configuration suppresses the pocket portions 2 from being crushed. The feeding operation with the pocket portions 2 placed in the recesses of each roll, for example, the intermittent feed roll 14, achieves the reliable intermittent feed and continuous feed.

Figure 4:
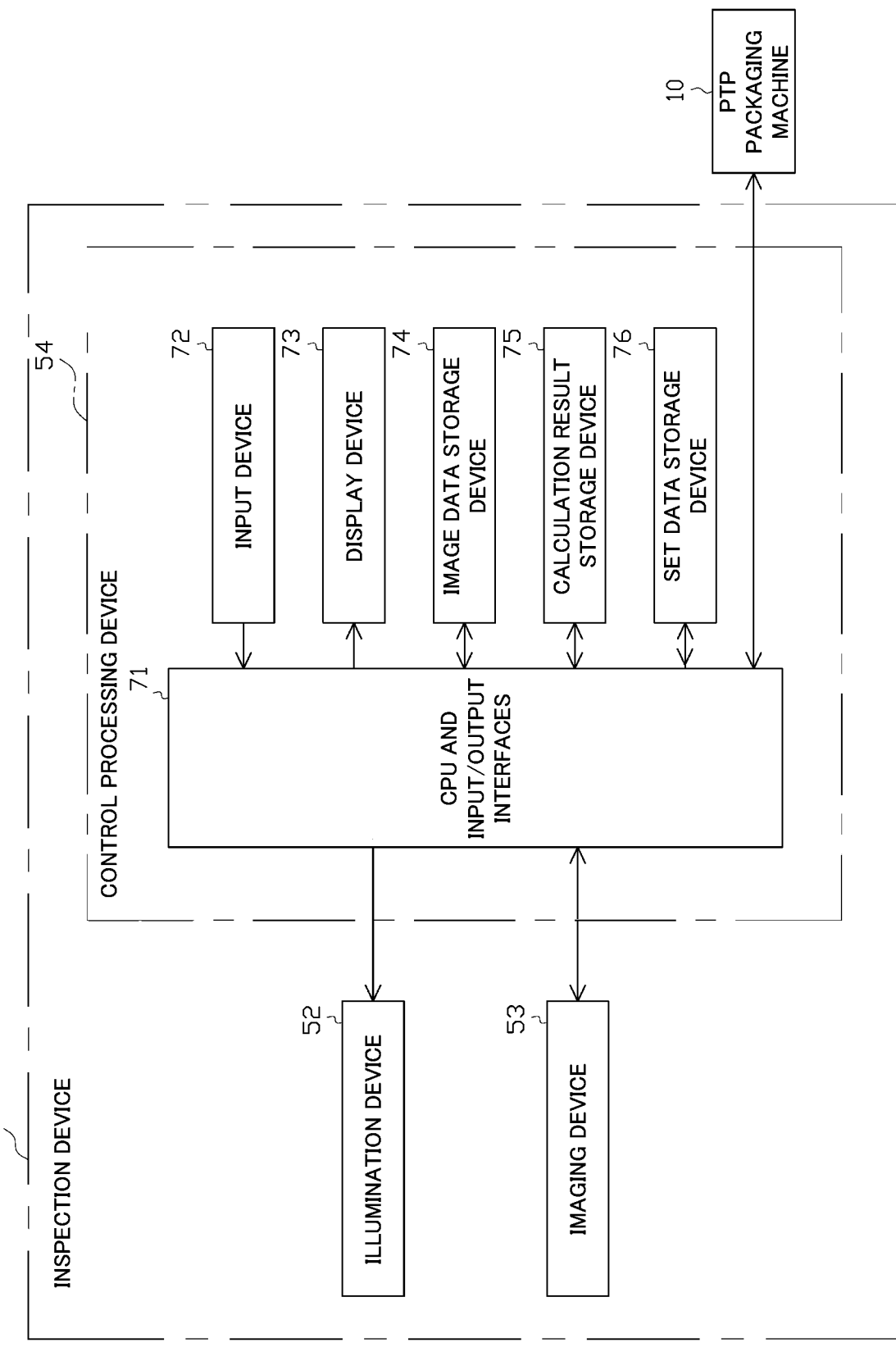
FIG. 4 is a block diagram illustrating the electrical configuration of an inspection device according to one or more embodiments.
Figure 5:
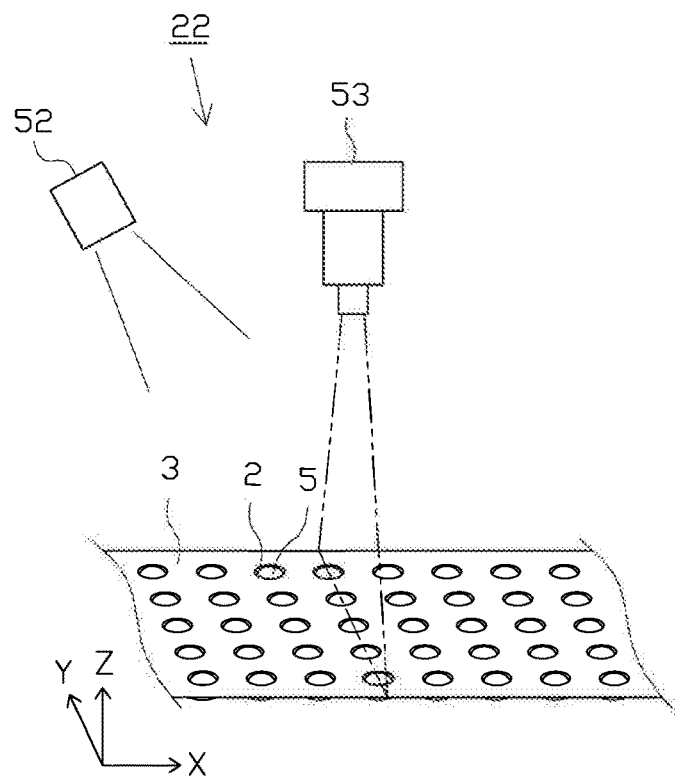
FIG. 5 is a perspective view schematically illustrating the arrangement configuration of the inspection device according to one or more embodiments.

The foregoing describes the outline of the PTP packaging machine 10. The following describes the configuration of the above inspection device 22 in detail with reference to drawings. FIG. 4 is a block diagram illustrating the electrical configuration of the inspection device 22. FIG. 5 is a perspective view schematically illustrating the arrangement configuration of the inspection device 22.

As shown in FIG. 4 and FIG. 5, the inspection device 22 includes an illumination device 52, an imaging device 53, and a control processing device 54 configured to perform various controls in the inspection device 22, for example, drive controls of the illumination device 52 and the imaging device 53, image processing, arithmetic operations and the like.

The illumination device 52 and the imaging device 53 are placed on an opening side of the pocket portions 2 of the container film 3. More specifically, according to one or more embodiments, an inspection for inclusion of any different type of object is performed from the opening side of the pocket portions 2 of the container film 3 in a stage prior to mounting of the cover film 4.

The illumination device 52 has a known configuration to radiate near-infrared light and provides the irradiation unit according to one or more embodiments. The illumination device 52 is arranged to irradiate a predetermined area on the continuously fed container film 3 obliquely downward with near-infrared light.

According to one or more embodiments, a halogen lamp is employed for the illumination device 52 as a light source configured to emit near-infrared light having a continuous spectrum (for example, a near infrared range having a wavelength of 700 to 2500 nm). Other examples usable as the light source include a deuterium lamp, a tungsten lamp, and a xenon lamp.

Figure 6:
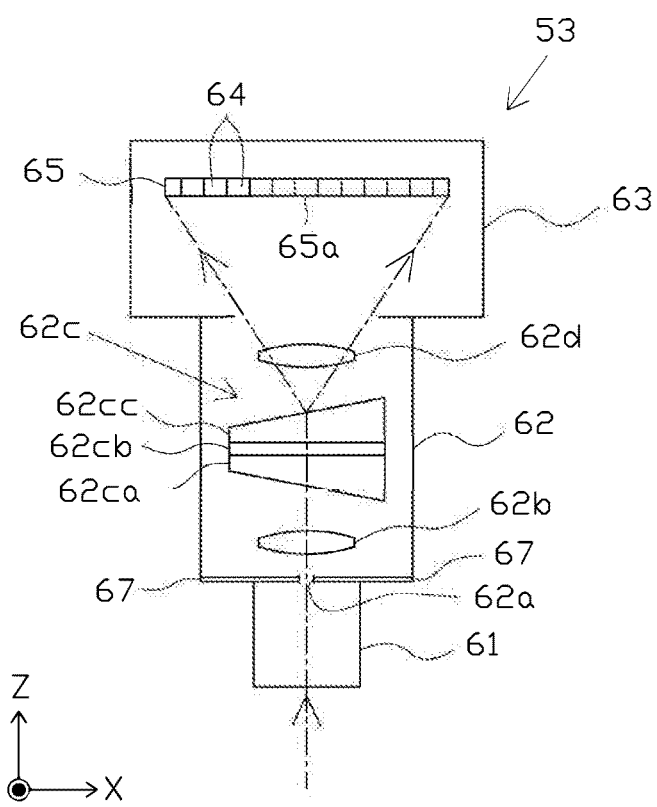
FIG. 6 is a diagram illustrating the schematic configuration of an imaging device according to one or more embodiments.

As shown in FIG. 6, the imaging device 53 includes an optical lens assembly 61, a two-dimensional spectroscope 62 serving as the spectral unit, and a camera 63 serving as the imaging unit.

The optical lens assembly 61 is comprised of a plurality of non-illustrated lenses and the like and is configured to convert incident light into parallel light. The optical lens assembly 61 has an optical axis that is set along a vertical direction (Z direction).

The optical lens assembly 61 is set to focus the incident light at the position of a slit 62a of the two-dimensional spectroscope 62 described later. As a matter of convenience, the following describes an example of employing a double-sided telecentric lens for the optical lens assembly 61. An image-sided telecentric lens is, however, also naturally employable for the optical lens assembly 61.

The two-dimensional spectroscope 62 is configured to include a slit 62a, an incident-side lens 62b, a spectral portion 62c and an emission-side lens 62d. The spectral portion 62c is configured to include an incident-side prism 62ca, a transmission type diffraction grating 62cb, and an emission-side prism 62cc.

Under the configuration described above, the light passing through the slit 62a is converted into parallel light by the incident-side lens 62b, is dispersed by the spectral portion 62c, and is focused by the emission-side lens 62d on an imaging element 65 of the camera 63 described later as a two-dimensional spectroscopic image (optical spectrum).

The slit 62a is formed between a pair of slit plates 67 in an approximately flat plate-like shape. The slit 62a is formed to have a long approximately rectangular (linear) opening and is provided such that a width direction (short side direction) thereof is arranged along a film conveying direction of the container film 3 (X direction) and that a longitudinal direction thereof is arranged along a film width direction of the container film 3 (Y direction) that is orthogonal to the conveying direction. Accordingly, the two-dimensional spectroscope 62 serves to disperse the incident light in the width direction of the slit 62a, i.e., in the film conveying direction (X direction).

Figure 7:
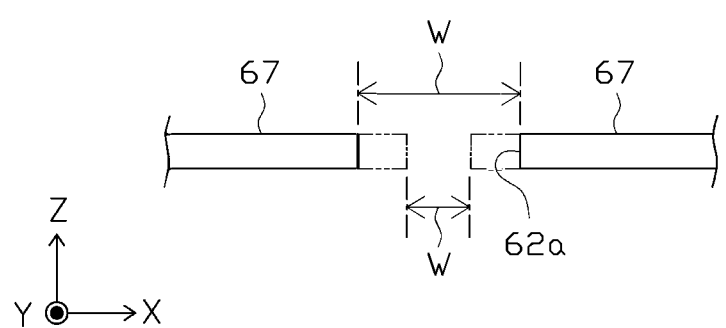
FIG. 7 is a diagram illustrating the configuration of a slit according to one or more embodiments.

According to one or more embodiments, each of the pair of slit plates 67 is configured to be slidable and displaceable along the film conveying direction (X direction) by a non-illustrated drive mechanism (as shown in FIG. 7). This causes a width W of the slit 62a to be adjustable. This configuration provides the slit adjustment unit according to one or more embodiments.

The camera 63 includes an imaging element 65 having a light receiving surface 65a where a plurality of light receiving elements (pixels) 64 are two-dimensionally arranged.

According to one or more embodiments, a CCD area sensor having sufficient sensitivity to, for example, a wavelength range of 900 to 1700 nm, out of the near infrared range, is employed as the imaging element 65. The imaging element is, however, necessarily not limited to this example, but another sensor having sensitivity to the near infrared range is also employable as the imaging element. For example, a CMOS sensor or an MCT (HgCdTe) sensor may be employed as the imaging element.

Figure 8:
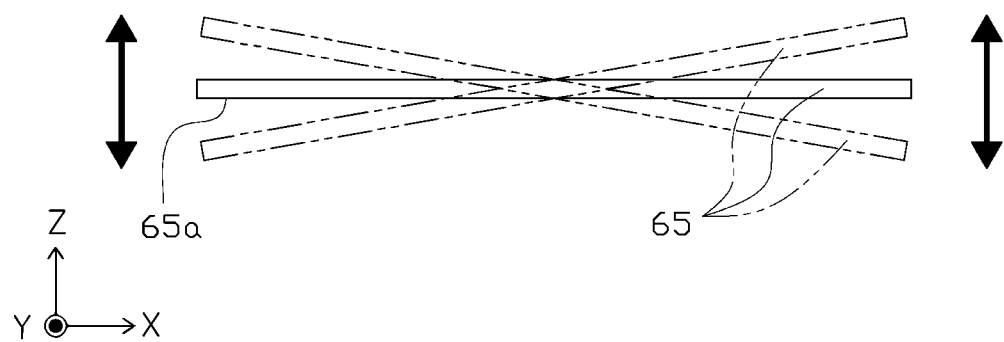
FIG. 8 is a diagram illustrating the configuration of an imaging element according to one or more embodiments.

The camera 63 is provided with actuators (not shown) configured to individually move up and down four corner portions of the imaging element 65 in a rectangular flat plate like shape. The imaging element 65 is accordingly configured to be moved up and down and to adjust its attitude (inclination) (as shown in FIG. 8). This configuration provides the imaging element adjustment unit according to one or more embodiments. The configuration relating to the imaging element adjustment unit is, however, not limited to the above configuration using the actuators and the like, but another configuration may be employable.

The imaging device 53 has a field of vision that is a linear region extended along the film width direction (Y direction) and that is a region including at least the entire film width direction of the container film 3 (as shown by a two-dot chain line portion in FIG. 5). The field of vision of the imaging device 53 in the film conveying direction (X direction) is, on the other hand, a region corresponding to the width W of the slit 62a. In other words, the field of vision is a region where an image of the light passing through the slit 62a (slit light) is formed on the light receiving surface 65a of the imaging element 65.

Dispersed light (wavelength component light) of reflected light that is reflected at each position in the film width direction (Y direction) of the container film 3 is received by each of the pixels 64 of the imaging element 65. A signal corresponding to the intensity of the light received by each of the pixels 64 is then output to the control processing device 54.

The control processing device 54 includes a CPU and input/output interfaces 71 (hereinafter referred to as "CPU and the like 71") that is configured to control the entire inspection device 22, an input device 72 that is configured as the "input unit" by, for example, a keyboard and a mouse or by a touch panel, a display device 73 that is configured as the "display unit" including a display screen such as a CRT screen or a liquid crystal screen, an image data storage device 74 that is configured to store various image data and the like, a calculation result storage device 75 that is configured to store results of various arithmetic operations and the like, and a set data storage device 76 that is configured to store various pieces of information in advance. These devices 72 to 76 are electrically connected with the CPU and the like 71.

The CPU and the like 71 is connected with the PTP packaging machine 10 such as to send and receive various signals to and from the PTP packaging machine 10. This configuration enables the CPU and the like 71 to control, for example, the defective sheet discharge mechanism of the PTP packaging machine 10.

The image data storage device 74 is configured to store, for example, spectroscopic image data taken by the imaging device 53, spectral image data obtained on the basis of the spectroscopic image data, binarized image data after a binarization process, and differential image data after differential processing.

The calculation result storage device 75 is configured to store, for example, inspection result data and statistical data obtained by statistically processing the inspection result data. These inspection result data and statistical data may be displayed appropriately on the display device 73.

The set data storage device 76 is configured to store, for example, a loading vector and a determination range used for principal component analysis, as well as the shapes and the dimensions of the PTP sheet 1, the pocket portion 2 and the tablet 5.

Figure 9A:
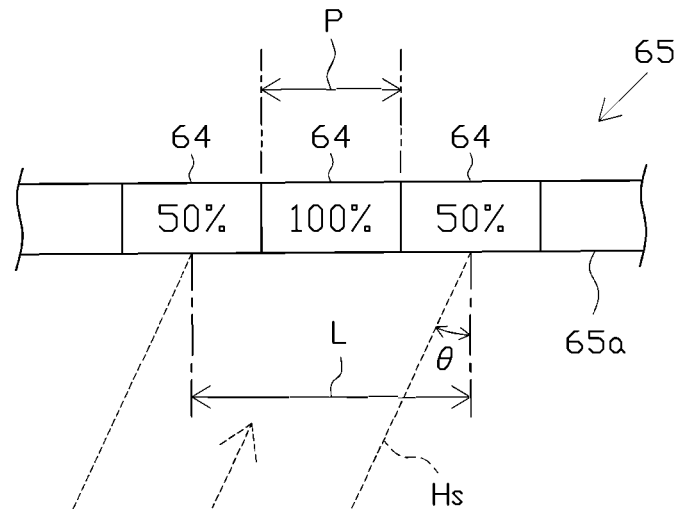
FIG. 9A and FIG. 9B are diagrams illustrating relationships between a projection position of wavelength component light and pixels of the imaging element according to one or more embodiments.
Figure 9B:
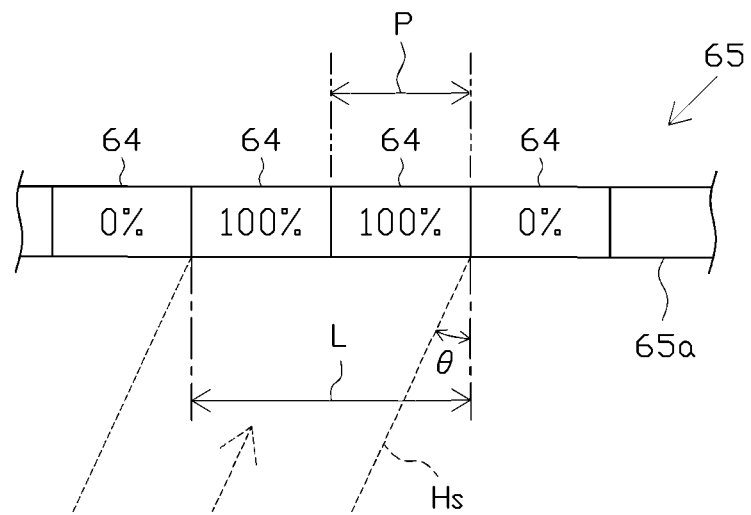

The following describes a setting process relating to the imaging device 53 of the inspection device 22. This setting process is a process of setting in advance a relationship between the light receiving surface 65a of the imaging element 65 and each wavelength component light $H_S$ projected thereon (as shown in FIG. 9A and FIG. 9B). According to one or more embodiments, the setting process is performed to satisfy a relational expression (1) given below:

$$L \geq 2P \qquad (1)$$

where L denotes a width of each wavelength component light $H_S$ in a wavelength dispersion direction on the light receiving surface 65a of the imaging element 65, and P denotes a width of the pixel 64 in the wavelength dispersion direction on the light receiving surface 65a of the imaging element 65.

Accordingly, as shown in FIG. 9A and FIG. 9B, the setting process is performed, such that the width L of each wavelength component light $H_S$ is equal to or greater than double the width P of the pixel 64 in the wavelength dispersion direction on the light receiving surface 65a of the imaging element 65.

More specifically, an operator operates the input device 72, the display device 73 and the like to perform slit adjustment processing (slit adjustment process) of adjusting the width W of the slit 62a of the two-dimensional spectroscope 62 and to perform imaging element adjustment processing (imaging element adjustment process) of adjusting the inclination of the imaging element 65.

According to one or more embodiments, for example, the imaging element 65 employed has the width P of the pixel 64 equal to 5.5 μm. Accordingly, the processing is performed to set the width W of the slit 62a to 50 μm.

A relationship between the width W of the slit and the width L of each wavelength component light $H_S$ in the wavelength dispersion direction on the light receiving surface 65a of the imaging element 65 may be defined by a relational expression (2) given below:

$$L = W/\cos \theta \qquad (2)$$

where θ denotes an incident angle of each wavelength component light $H_S$ relative to the light receiving surface 65a of the imaging element 65.

The following describes a procedure of different type inclusion inspection (inspection process) performed by the inspection device 22.

Figure 10:
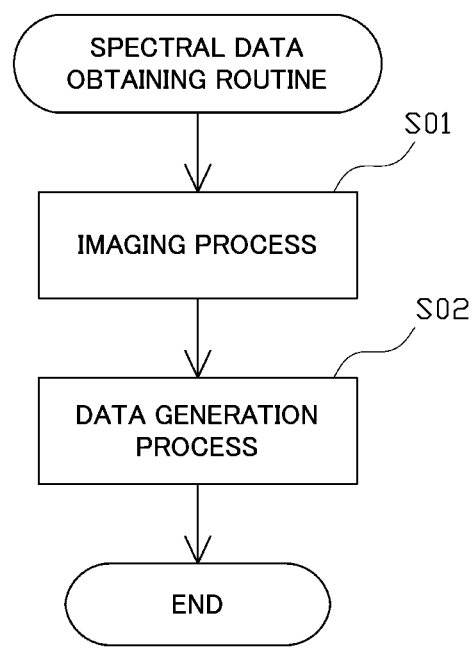
FIG. 10 is a flowchart showing a spectral data obtaining routine according to one or more embodiments.

A spectral data obtaining routine performed to obtain spectral data as an analysis subject is described first with reference to the flowchart of FIG. 10. This routine is performed repeatedly every time a predetermined amount of the container film 3 is conveyed.

At step S01, the control processing device 54 first causes the imaging device 53 to perform an imaging process (exposure process), while irradiating the continuously conveyed container film 3 (tablet 5) with near-infrared light emitted from the illumination device 52 (irradiation process).

The control processing device 54 drives and controls the imaging device 53 in response to a signal input from a non-illustrated encoder provided in the PTP packaging machine 10, and stores spectroscopic image data taken by the imaging device 53 into the image data storage device 74.

Accordingly, reflected light that is reflected in a conveying direction imaging range D (shown in FIG. 12), out of the near-infrared light emitted from the illumination device 52 toward the container film 3, during an execution period of the imaging process of step S01 (exposure period) enters the imaging device 53. In other words, an image of the conveying direction imaging range D is taken by one imaging process.

The reflected light entering the imaging device 53 is dispersed by the two-dimensional spectroscope 62 (dispersion process) and is taken in the form of a spectroscopic image (optical spectrum) by the imaging element 65 of the camera 63. The container film 3 (tablet 5) is continuously conveyed during an execution period of the imaging process (exposure period), so that an averaged optical spectrum in the conveying direction imaging range D is taken.

The spectroscopic image data taken by the imaging device 53 is output to the control processing device 54 during an interval period and is stored into the image data storage device 74. The interval period herein denotes a reading period of image data. Accordingly, an imaging cycle of the imaging device 54 is expressed by a total time of the exposure period that is the execution period of the imaging process and the interval period.

When obtaining the spectroscopic image data, the control processing device 54 starts a data generation process at step S02.

The data generation process generates spectral data, based on the spectroscopic image data obtained at step S01. After generation of the spectral data, the control processing device 54 stores the generated spectral data into the image data storage device 74 and then terminates this routine. This process corresponds to the spectral data obtaining process according to one or more embodiments. The processing function of the control processing device 54 that performs this process provides the spectral data obtaining unit according to one or more embodiments.

Figure 12:
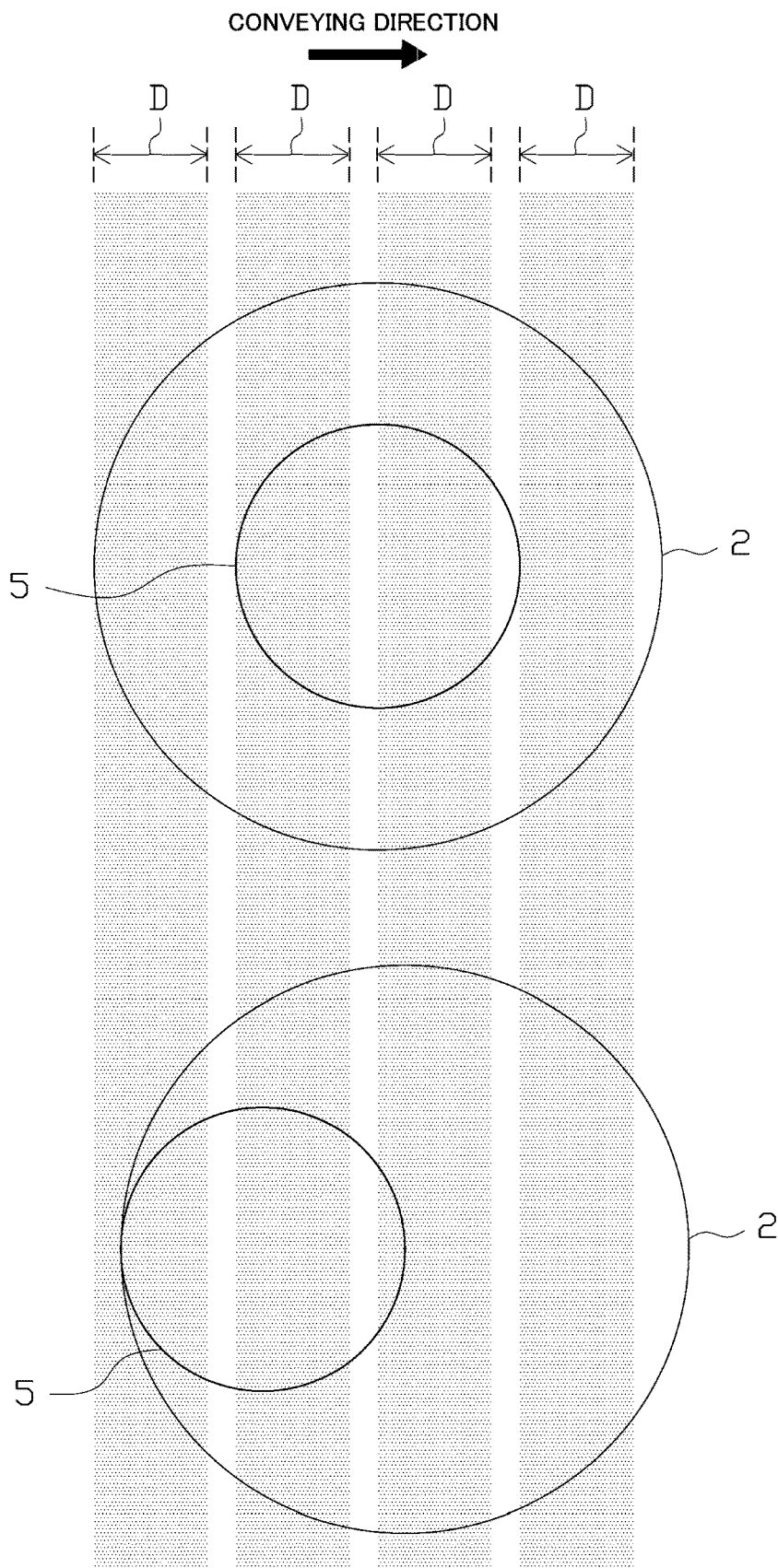
FIG. 12 is a diagram illustrating a relationship between a conveying direction imaging range and a tablet or the like according to one or more embodiments.

As shown in FIG. 12, every time a predetermined amount of the container film 3 (tablet 5) is conveyed, the conveying direction imaging range D is relatively moved intermittently and the spectral data obtaining routine described above is performed repeatedly. This causes spectral data corresponding to the respective conveying direction imaging ranges D to be successively stored into the image data storage device 74 in time series along with position information in the film width direction. This series of operations generate a two-dimensional spectral image G having spectral data with regard to each pixel (as shown in FIG. 13).

The following describes the spectral image G according to one or more embodiments. As shown in FIG. 13, the spectral image G is image data including a plurality of pixels Ga arrayed two-dimensionally. Each of the pixels Ga includes spectral data (data indicating spectral intensities at a plurality of wavelengths or in a wavelength band).

When obtaining the spectral image G in a range corresponding to one PTP sheet 1 as an inspection object (as shown by a two-dot chain line portion in FIG. 13), the control processing device 54 performs an inspection routine.

Figure 11:
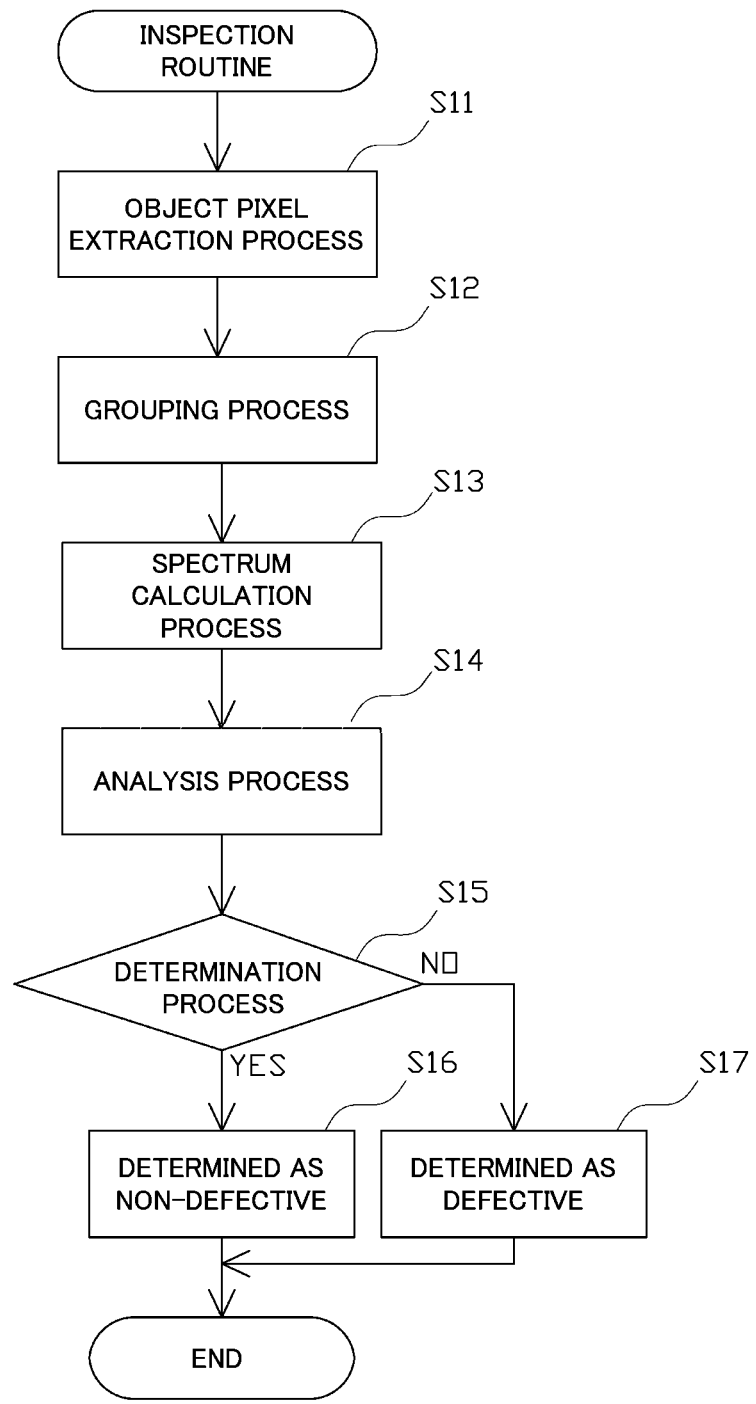
FIG. 11 is a flowchart showing an inspection routine according to one or more embodiments.

The following describes the inspection routine with reference to the flowchart of FIG. 11. The inspection routine is performed repeatedly every time the spectral image in a range corresponding to one PTP sheet 1 is obtained.

The control processing device 54 first extracts pixels corresponding to the tablet 5 or more specifically pixels as analysis subject (object pixels) Gb out of the respective pixels Ga of the spectral image G at step S11.

According to one or more embodiments, for example, the control processing device 54 determines whether intensity data (luminance value) at a predetermined wavelength in the spectral data of each pixel Ga is equal to or greater than a predetermined reference value and processes the spectral image G by a binarization process. The control processing device 54 then extracts object pixels Gb based on the obtained binarized image data (as shown in FIG. 13 and FIG. 14).

Figure 14:
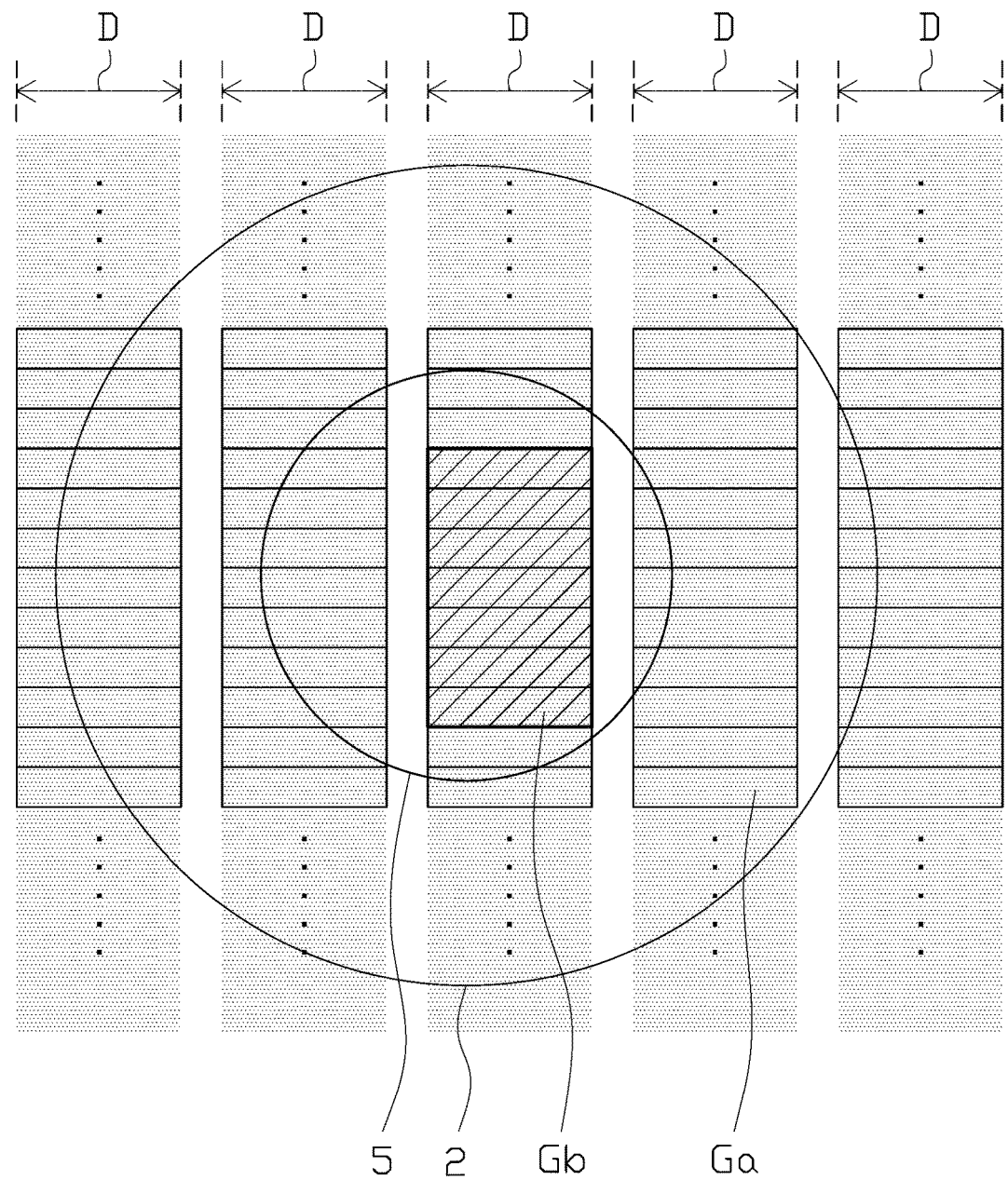
FIG. 14 is a diagram illustrating a relationship between the conveying direction imaging range and the spectral image according to one or more embodiments.
Figure 15:
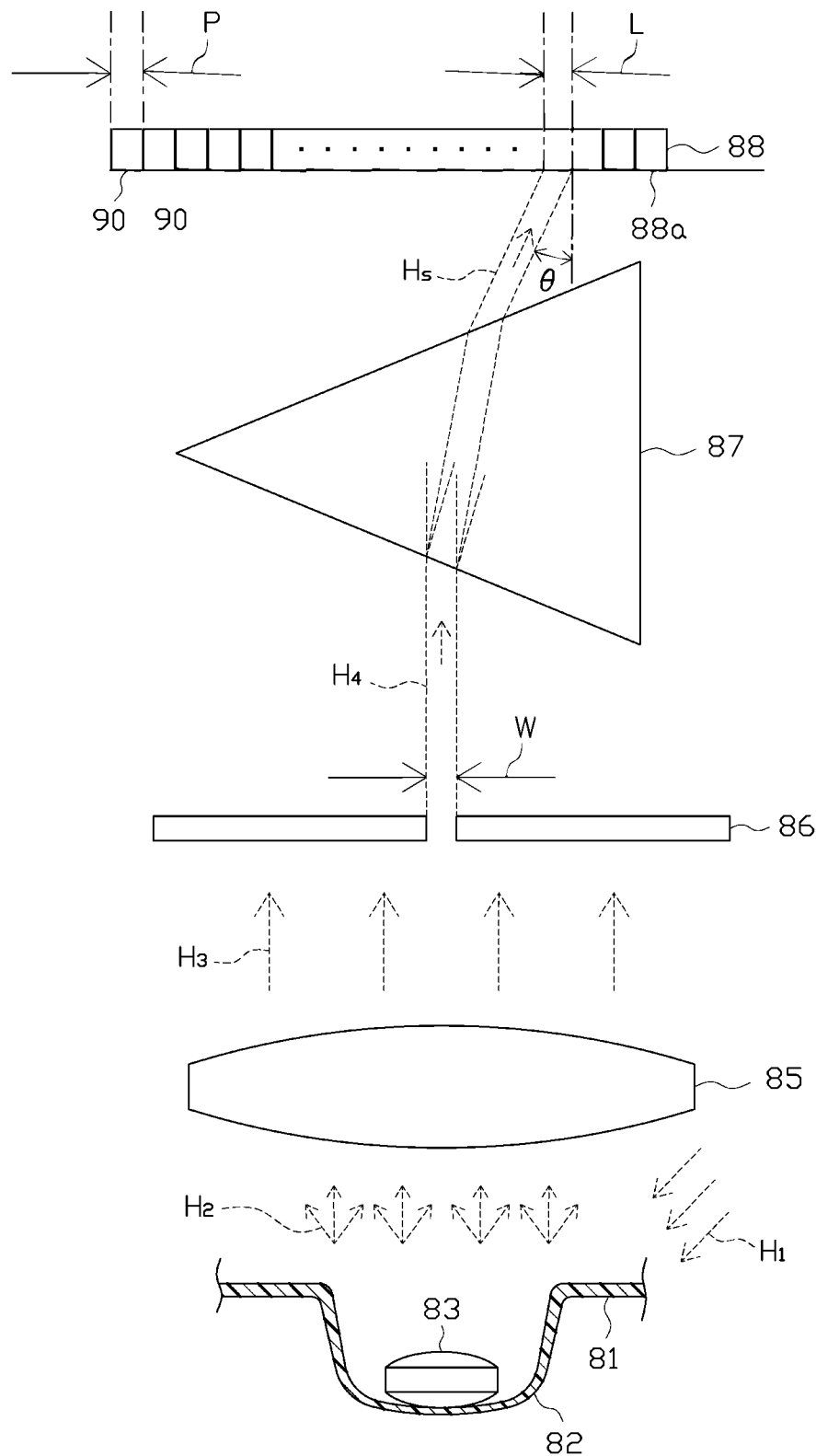
FIG. 15 is a diagram illustrating the schematic configuration of a conventional inspection device relating to spectral analysis.
Figure 16:
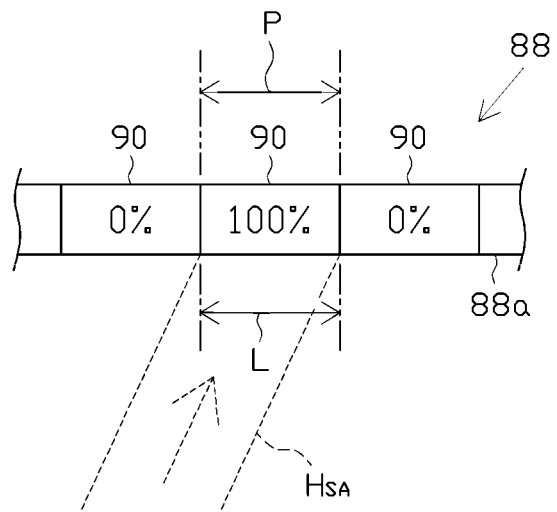
FIG. 16 is a diagram illustrating a state that the projection position of one wavelength component light matches with one pixel.
Figure 17:
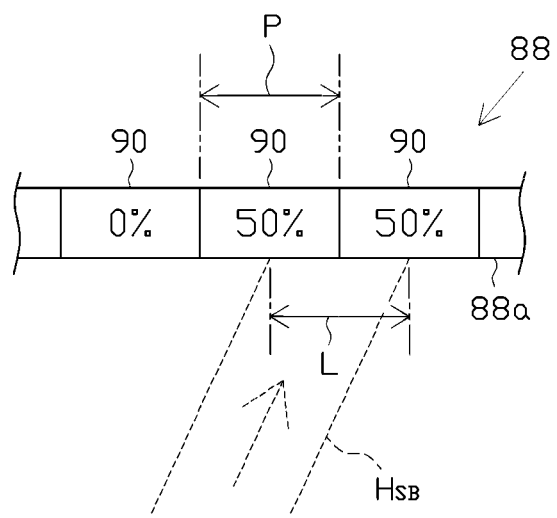
FIG. 17 is a diagram illustrating a state that the projection position of one wavelength component light is extended over two pixels.
Figure 18:
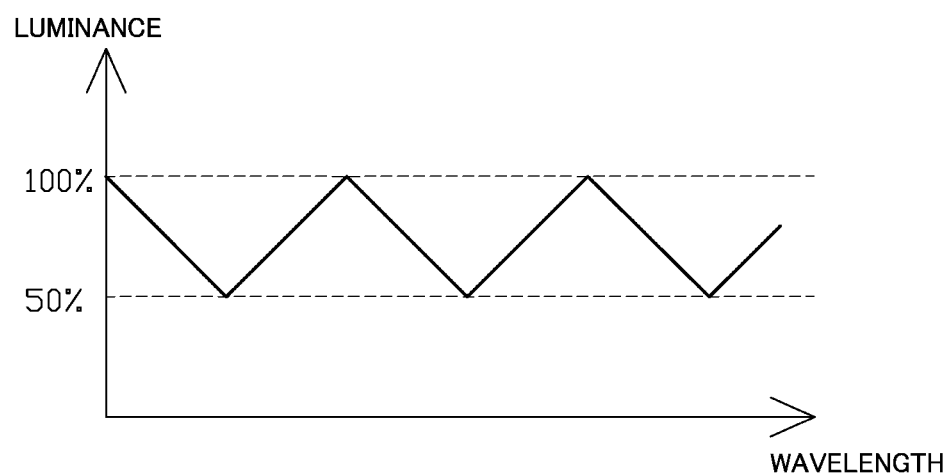
FIG. 18 is a graph schematically illustrating a relationship between a wavelength component and a ratio of luminance level obtained corresponding to the wavelength component.

According to one or more embodiments, as shown in FIG. 14, pixels Ga including data of imaging only the range of the tablet 5 without being affected by background are extracted as object pixels Gb. FIG. 14 is a diagram illustrating a relationship between the conveying direction imaging range D and the spectral image G. Pixels extracted as the object pixels Gb are given as hatched areas in FIGS. 13 and 14.

The method of pixel extraction is, however, not limited to this method, but another method may be employed for pixel extraction. For example, another employable method may calculate an integrated value of spectral data with regard to each of the pixels Ga and determine whether the calculated integrated value is equal to or greater than a predetermined reference value, so as to extract the object pixels Gb.

At subsequent step S12, the control processing device 54 performs a grouping process of the object pixels Gb obtained at step S11. According to one or more embodiments, for example, all object pixels Gb adjacent to one another are specified as one group.

The method of grouping is, however, not limited to this method, but another method may be employed for grouping. For example, another employable method may specify pixels included in a predetermined range around a specific pixel, as pixels of an identical group with the specific pixel.

The object pixels Gb grouped as one group are handled as the object pixels Gb relating to one identical tablet 5 (as shown in FIG. 13 and FIG. 14). The object pixels Gb grouped as one group are encircled by a thick frame in FIG. 13 and FIG. 14.

At subsequent step S13, the control processing device 54 calculates spectral data with regard to the tablet 5 corresponding to the group of object pixels Gb, based on the spectral data of the object pixels Gb grouped at step S12 described above.

According to one or more embodiments, the control processing device 54 uses all the spectral data of the grouped object pixels Gb and calculates an average value of the spectral data as spectral data with regard to the tablet 5. This method is, however, not essential. Another available method may extract one or more object pixel Gb out of the grouped object pixels Gb and calculate spectral data of the extracted object pixel as the spectral data with regard to the tablet 5. Another available method may appropriately perform differential processing.

The control processing device 54 subsequently performs an analysis process at step S14. This process corresponds to the analysis process according to one or more embodiments. The function of the control processing device 54 that performs this process provides the analysis unit according to one or more embodiments.

According to one or more embodiments, the control processing device 54 uses a loading vector obtained in advance and performs principal component analysis (PCA) with regard to the spectral data of the tablet 5 calculated at step S13. More specifically, the control processing device 54 calculates a principal component point by arithmetic operation of the loading vector and the spectral data of the tablet 5.

The control processing device 54 subsequently performs a determination process of determining whether the tablet 5 as the object is a non-defective product (identical type of object) or a defective product (different type of object) at step S15. More specifically, the control processing device 54 plots the principal component point calculated at step S14 described above in a PCA chart and determines the tablet 5 as a non-defective product (identical type of object) when the plotted data is within a non-defective range set in advance, while determining the tablet 5 as a defective product (different type of object) when the plotted data is out of the non-defective range.

The series of processing involved in step S15 described above is performed for each of all the tablets on the PTP sheet 1. When there is no tablet 5 determined as "defective", the control processing device 54 determines the PTP sheet 1 as a non-defective product (step S16) and then terminates this routine. When there is any tablet 5 determined as "defective", on the other hand, the control processing device 54 determines the PTP sheet 1 as a defective product (step S17) and then terminates this routine. The result of this inspection is output to the display device 73 and to the PTP packaging machine 10 (including the defective sheet discharge mechanism).

As described above in detail, according to one or more embodiments, the relationship between the light receiving surface 65a of the imaging element 65 and each wavelength component light $H_S$ projected on the light receiving surface 65a is set to satisfy the relational expression (1) given above. Accordingly, as shown in FIG. 9A and FIG. 9B, with respect to each of all the wavelength component lights $H_S$, there is at least one pixel 64 that is capable of receiving one wavelength component light $H_S$ across the full width in the wavelength dispersion direction, irrespective of the projection position of the wavelength component light $H_S$ on the light receiving surface 65a of the imaging element 65. As a result, the luminance level of each wavelength component light $H_S$ is appropriately reflected on the spectral data. This improves the inspection accuracy in different type inclusion inspection taking advantage of spectral analysis.

The present invention is not limited to the description of the above embodiments but may be implemented, for example, by configurations described below. The present invention may also be naturally implemented by applications and modifications other than those illustrated below.

(a) According to the embodiments described above, the object is the tablet 5. The type, the shape and the like of the object are, however, not specifically limited. For example, the object may be a capsule, a supplement, or a food item. The tablet includes a solid preparation such as an uncoated tablet and a sugar-coated tablet.

(b) According to the embodiments described above, the container film 3 is made of the transparent or translucent thermoplastic resin material such as PP, and the cover film 4 is made of aluminum. The materials of the respective films 3 and 4 are, however, not limited to these materials but may be other materials.

For example, the container film 3 may be made of a metal material that includes aluminum as a main material, for example, aluminum laminated film.

(c) The arrangement and the number of the pocket portions 2 in the PTP sheet 1 are not limited at all to those described in the above embodiments. A PTP sheet may be configured to have any of various other arrangements of and any number of pocket portions, for example, a total of twelve pocket portions arrayed in three lines.

(d) According to the embodiments described above, the inspection device 22 is configured to perform the different type inclusion inspection in a post process after the tablets 5 are filled in the pocket portions 2 and a previous process before the cover film 4 is mounted to the container film 3.

This configuration is, however, not essential. According to a modification, the inspection device 22 may be configured to perform the different type inclusion inspection from the container film 3-side of the PTP film 6 in a post process after the cover film 4 is mounted to the container film 3 and a previous process before the PTP sheets 1 are punched out from the PTP film 6.

According to another modification, the inspection device 22 may be configured to perform the different type inclusion inspection from the container film 3-side of the PTP sheet 1 conveyed by the extraction conveyor 39 in a post process after the PTP sheets 1 are punched out from the PTP film 6.

According to another modification, the inspection device 22 may be configured to perform the different type inclusion inspection in a previous process before the tablets 5 are filled in the pocket portions 2. For example, the inspection may be performed in a stage before the tablets 5 are fed into the tablet filling device 21. In other words, the inspection device 22 may be provided as a device of performing an offline inspection of the tablets 5, separately from the PTP packaging machine 10.

(e) The configurations of the illumination device 52 and the imaging device 53 are not limited to those described in the above embodiment. For example, a reflection type diffraction grating, a prism and the like may be employed as the spectral unit, in place of the two-dimensional spectroscope 62.

(f) According to the embodiments described above, the spectral data are analyzed by principal component analysis (PCA). This method is, however, not essential. Another known method, such as PLS regression analysis may be employed to analyze the spectral data.

(g) The embodiments described above have the (inline) configuration where the inspection device 22 is provided in the PTP packaging machine 10. According to a modification, the inspection device 22 may be provided as a device of performing an offline inspection of the PTP sheet 1, separately from the PTP packaging machine 10. Additionally, the inspection device 22 may be equipped with a conveyance unit to convey the PTP sheet 1.

(h) The embodiments described above do not specifically mention an upper limit of the width L of each wavelength component light $H_S$ in the wavelength dispersion direction on the light receiving surface 65a of the imaging element 65. The upper limit of the width L of each wavelength component light $H_S$ may, however, be set to satisfy, for example, a relational expression (3) given below:

$$1000 \times P \geq L \quad (3)$$

Such setting increases the number of pixels that are capable of receiving one wavelength component light $H_S$ across the full width in the wavelength dispersion direction. This accordingly reduces an error due to, for example, a variation in luminance and further improves the inspection accuracy.

(i) The embodiments described above are configured to cause the operator to operate the input device 72, the display device 73 and the like and thereby perform slit adjustment processing (slit adjustment process) of adjusting the width W of the slit 62a of the two-dimensional spectroscope 62 and to perform imaging element adjustment processing (imaging element adjustment process) of adjusting the inclination of the imaging element 65.

This configuration is, however, not essential. A modification may be configured to perform only either one of the slit adjustment processing and the imaging element adjustment processing. These processing may be automated.

A configuration that enables the imaging element 65 to be replaced may be employed, in place of or in addition to the above configuration. More specifically, replacement of the imaging element 65 with another imaging element having a different size of pixel 64 is configured to change the setting, in order to satisfy the relational expressions (1) and (3) given above.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 3 . . . container film, 4 . . . cover film, 5 . . . tablet, 10 . . . PTP packaging machine, 22 . . . inspection device, 52 . . . illumination device, 53 . . . imaging device, 54 . . . control processing device, 62 . . . two-dimensional spectroscope, 62a . . . slit, 63 . . . camera, 63a . . . imaging element, L . . . width of each wavelength component light in a wavelength dispersion direction on a light receiving surface of the imaging element, P . . . width of a pixel in the wavelength dispersion direction on the light receiving surface of the imaging element, W . . . width of the slit

The invention claimed is:

1. An inspection device comprising:
an irradiator that irradiates an object with near-infrared light;
a spectroscope that has a predetermined slit where reflected light from the irradiated object enters and that disperses the reflected light into wavelength component lights;
an imaging device that comprises an imaging element that takes a spectroscopic image of the wavelength component lights; and
a processor that:
obtains spectral data based on the spectroscopic image; and
detects a type of the object using a predetermined analysis based on the spectral data, wherein
each of the wavelength component lights is a single wavelength light,
the inspection device satisfies relational expression (1):

$$L \geq 2P \quad (1)$$

where L is a width of each of the wavelength component lights in a wavelength dispersion direction on a light receiving surface of the imaging element and P is a width of a pixel in the wavelength dispersion direction on the light receiving surface.

2. The inspection device according to claim 1, further comprising:
a width of the predetermined slit is adjusted using a slit plate and a drive mechanism of the slit plate.

3. The inspection device according to claim 2, further comprising:

an inclination of the imaging element is adjusted using an actuator that moves the imaging element.

4. The inspection device according to claim 1, further comprising:
an inclination of the imaging element is adjusted using an actuator that moves the imaging element.

5. A Press Through Package (PTP) packaging machine that manufactures a PTP sheet, the PTP packaging machine comprising:
a pocket portion former that forms a pocket portion in a container film that is conveyed in a belt-like manner;
a filler that fills an object into the pocket portion;
a mounter that mounts a cover film onto the container film to close the pocket portion;
a separator that separates the PTP sheet from a belt-like body obtained by mounting the cover film to the container film; and
the inspection device according to claim 1.

6. An inspection device comprising:
an irradiator that irradiates an object with near-infrared light;
a spectroscope that has a predetermined slit where reflected light from the irradiated object enters and that disperses the reflected light into wavelength component lights;
an imaging device that comprises an imaging element that takes a spectroscopic image of the wavelength component lights; and
a processor that:
obtains spectral data based on the spectroscopic image; and
detects a type of the object using a predetermined analysis based on the spectral data, wherein
each of the wavelength component lights is a single wavelength light,
the inspection device satisfies relational expression (1) and relational expression (2):

$$L \geq 2P \qquad (1)$$

$$L = W/\cos\theta \qquad (2)$$

where L is a width of each of the wavelength component lights in a wavelength dispersion direction on a light receiving surface of the imaging element, P is a width of a pixel in the wavelength dispersion direction on the light receiving surface, W is a width of the predetermined slit, and θ is an incident angle of each of the wavelength component lights relative to the light receiving surface.

7. The inspection device according to claim 6, further comprising:
a width of the predetermined slit is adjusted using a slit plate and a drive mechanism of the slit plate.

8. The inspection device according to claim 7, further comprising:
an inclination of the imaging element is adjusted using an actuator that moves the imaging element.

9. The inspection device according to claim 6, further comprising:
an inclination of the imaging element is adjusted using an actuator that moves the imaging element.

10. A Press Through Package (PTP) sheet manufacturing method for manufacturing a PTP sheet, the method comprising:
forming a pocket portion in a container film that is conveyed in a belt-like manner;
filling an object into the pocket portion;
mounting a cover film onto the container film to close the pocket portion;
separating the PTP sheet from a belt-like body obtained by mounting the cover film to the container film; and
inspecting for inclusion of another object of a different type, wherein
the inspecting comprises:
irradiating the object with near-infrared light;
causing reflected light from the irradiated object to enter a predetermined slit of a spectroscope and dispersing, by the spectroscope, the reflected light into wavelength component lights;
taking, using an imaging device that comprises a predetermined imaging element, a spectroscopic image of the wavelength component lights;
obtaining spectral data based on the spectroscopic image; and
detecting a type of the object using a predetermined analysis based on the spectral data, wherein
each of the wavelength component lights is a single wavelength light,
the inspecting is performed under settings that satisfy relational expression (1):

$$L \geq 2P \qquad (1)$$

where L is a width of each of the wavelength component lights in a wavelength dispersion direction on a light receiving surface of the imaging element and P is a width of a pixel in the wavelength dispersion direction on the light receiving surface.

11. The PTP sheet manufacturing method according to claim 10, further comprising:
adjusting a width of the slit.

12. The PTP sheet manufacturing method according to claim 10, further comprising:
adjusting an inclination of the imaging element.

13. A PTP sheet manufacturing method for manufacturing a PTP sheet, the method comprising:
forming a pocket portion in a container film that is conveyed in a belt-like manner;
filling an object into the pocket portion;
mounting a cover film onto the container film to close the pocket portions;
separating the PTP sheet from a belt-like body obtained by mounting the cover film to the container film; and
inspecting for inclusion of another object of a different type, wherein
the inspecting comprises:
irradiating the object with near-infrared light;
causing reflected light from the irradiated object to enter a predetermined slit of a spectroscope and dispersing, by the spectroscope, the reflected light into wavelength component lights;
using an imaging device that comprises a predetermined imaging element to take a spectroscopic image of the wavelength component lights;
obtaining spectral data based on the spectroscopic image; and
detecting a type of the object using a predetermined analysis including principal component analysis, based on the spectral data, wherein
each of the wavelength component lights is a single wavelength light, the inspecting is performed under settings that satisfy relational expression (1) and a relational expression (2):

$$L \geq 2P \quad (1)$$

$$L = W/\cos\theta \quad (2)$$

where L is a width of each of the wavelength component lights in a wavelength dispersion direction on a light receiving surface of the imaging element, P is a width of a pixel in the wavelength dispersion direction on the light receiving surface, W is a width of the slit, and $\theta$ is an incident angle of the wavelength component light relative to the light receiving surface.

14. The PTP sheet manufacturing method according to claim 13, further comprising:
   adjusting a width of the slit.

* * * * *